(12) United States Patent     (10) Patent No.:   US 12,589,727 B2

Xu et al.     (45) Date of Patent:    Mar. 31, 2026

(54) ENERGY CONTROL METHOD AND SYSTEM OF LIFT TRUCK

(71) Applicant: ZHEJIANG DINGLI MACHINERY CO., LTD, Huzhou (CN)

(72) Inventors: Zhong Xu, Huzhou (CN); Shugen Xu, Huzhou (CN)

(73) Assignee: ZHEJIANG DINGLI MACHINERY CO., LTD., Huzhou (CN)

( * ) Notice: Subject to any disclaimer, the term of this patent is extended or adjusted under 35 U.S.C. 154(b) by 313 days.

(21) Appl. No.: 18/518,491

(22) Filed: Nov. 23, 2023

(65) Prior Publication Data

US 2024/0083408 A1     Mar. 14, 2024

(30) Foreign Application Priority Data

Sep. 11, 2023    (CN) ......................... 202311161620.9

(51) Int. Cl.
| | |
|---|---|
| *B60W 10/26* | (2006.01) |
| *B66F 9/20* | (2006.01) |
| *B60P 1/44* | (2006.01) |
| *B60P 1/64* | (2006.01) |

(52) U.S. Cl.
CPC ............. *B60W 10/26* (2013.01); *B66F 9/205* (2013.01); *B60P 1/4471* (2013.01); *B60P 1/6472* (2013.01); *B60W 2510/246* (2013.01)

(58) Field of Classification Search
CPC ................................. B60W 10/26; B66F 9/205
See application file for complete search history.

(56) References Cited

U.S. PATENT DOCUMENTS

| | | | | |
|---|---|---|---|---|
| 9,975,426 | B2 * | 5/2018 | McCann ................ | B60K 25/10 |
| 2007/0278048 | A1 | 12/2007 | Futahashi et al. | |
| 2008/0128214 | A1 | 6/2008 | Tahashi et al. | |
| 2011/0273141 | A1 * | 11/2011 | Kanbayashi .......... | B60W 20/13 |
| | | | | 320/134 |
| 2013/0145751 | A1 | 6/2013 | Han et al. | |
| 2014/0214250 | A1 * | 7/2014 | Murakami .............. | B60L 53/55 |
| | | | | 701/22 |
| 2014/0332294 | A1 * | 11/2014 | Soma' ...................... | B60K 6/46 |
| | | | | 180/65.245 |
| 2016/0152138 | A1 * | 6/2016 | McCann .................. | B60K 1/02 |
| | | | | 180/65.265 |
| 2022/0034064 | A1 * | 2/2022 | Gorman ................ | E02F 9/0808 |
| 2024/0083408 | A1 * | 3/2024 | Xu ............................ | B66F 9/22 |
| 2025/0070542 | A1 * | 2/2025 | Law, Jr. .................. | F16L 3/015 |

* cited by examiner

*Primary Examiner* — Erez Gurari
(74) *Attorney, Agent, or Firm* — Hemisphere Law, PLLC

(57) ABSTRACT

The present disclosure relates to the technical field of lift trucks, and in particular, to an energy control method and system of a lift truck. The method includes the following steps: step 1, putting the lift truck in a working state, and downwards closing a work platform at a high place, wherein hydraulic oil in an upper lifting oil cylinder and hydraulic oil in a lower lifting oil cylinder start to flow back into a oil tank; step 2, driving a hydraulic element to rotate anticlockwise in the back flowing process of the hydraulic oil, wherein the anticlockwise rotation of the hydraulic element drives a motor to rotate anticlockwise to generate a reverse electromotive force, and the reverse electromotive force is rectified to output a direct current for energy recycling.

10 Claims, 8 Drawing Sheets

ENERGY CONTROL METHOD AND SYSTEM OF LIFT TRUCK

TECHNICAL FIELD

The present disclosure relates to the technical field of lift trucks, and in particular, to an energy control method and system of a lift truck.

BACKGROUND

In the prior art, there are various kinds of lift trucks with aerial work platforms, but their entire lifting frameworks are similar. An internal lifting system is basically electric or hydraulic. Due to a large weight and lifting range of the aerial work platform, high potential energy would be generated. At present, many sets of equipment will recycle this part of potential energy.

Chinese patent No. 201720827594.2 discloses a hydraulic energy-saving system of an aerial work platform. The hydraulic energy-saving system includes an aerial work platform body, a boom, a hydraulic pump, and an oil tank. A boom oil cylinder is arranged between an aerial work platform body and the boom to drive the boom to rise and fall. The boom oil cylinder is a double-acting oil cylinder, and the oil tank is connected to an oil inlet of the hydraulic pump. The hydraulic energy-saving system further includes a check valve I, a proportional electromagnetic valve, an electromagnetic directional valve I, an energy accumulator, an electromagnetic directional valve II, an overflow valve I, a check valve II, a check valve III, a check valve IV, and an overflow valve II. An energy storage oil cylinder that extends and retracts as the boom rises and falls is arranged between the aerial work platform body and the boom. The energy storage oil cylinder is a single-acting oil cylinder.

The system in the above patent can recycle the potential energy, but would use some transferring structures such as the energy storage oil cylinder and the energy accumulator. Furthermore, only an oil path system of the boom oil cylinder is improved, so that the recycling timeliness of energy is not enough, which may cause a lot of waste. A proportion of the oil path system in a lifting part of the work platform is reduced significantly, which has an impact on stability, and the recycling of the overall potential energy is not optimized.

SUMMARY

The present disclosure aims to provide an energy control method and system of a lift truck, which have better energy recycling and usage effects.

The above objective of the present disclosure is achieved by the following technical solutions: An energy control method of a lift truck includes the following steps: step 1, putting the lift truck in a working state, and downwards closing a work platform located at a high place, wherein hydraulic oil in an upper lifting oil cylinder and hydraulic oil in a lower lifting oil cylinder start to flow back into a oil tank; step 2, driving a hydraulic element to rotate anticlockwise in the back flowing process of the hydraulic oil, wherein the anticlockwise rotation of the hydraulic element drives a motor to rotate anticlockwise to generate a reverse electromotive force, and the reverse electromotive force is rectified to output direct current for energy recycling; and step 3, applying a part of the recycled feedback direct current to heating the hydraulic oil, and applying the other part to heating and charging a power battery.

As a preference, in step 3, when a temperature of the power battery is greater than −8° C., the feedback direct current is all received by the power battery and is configured to charge the power battery; when the temperature of the power battery is less than −8° C., and a temperature of the hydraulic oil is greater than 45° C., the feedback direct current is partially configured to heat the power battery and is partially configured to charge the power battery; and when the temperature of the power battery is less than −8° C. and the temperature of the hydraulic oil is less than 45° C., the feedback direct current is partially configured to heat the power battery, is partially configured to charge the power battery, and is partially configured to heat the hydraulic oil.

As a preference, in step 2, the rectified and output direct current is rectified and output by a driving controller and is distributed to the power battery and the hydraulic oil for use on demand.

As a preference, a current part distributed to the power battery is controlled through a battery management system to respectively charge and heat the power battery.

As a preference, the heating of the hydraulic oil in step 3 is achieved by a hydraulic oil heating film.

As a preference, the heating of the power battery in step 3 is achieved by a battery heating film.

As a preference, the hydraulic oil heating film includes two or more oblique films which are oblique relative to a horizontal plane and are integrally connected with each other.

As a preference, in step 1, the upper lifting oil cylinder and the lower lifting oil cylinder are located in a same hydraulic system.

As a preference, the hydraulic system includes an emergency valve which causes the hydraulic oil to flow back to the hydraulic element to make the hydraulic element rotate anticlockwise and recycle energy and then flow into the oil tank, and is switched to directly cause the hydraulic oil to flow back into the oil tank.

An energy control system of a lift truck includes a work platform, a hydraulic system, a current distribution module, a power battery, a charging module, a battery heating module, and a hydraulic oil heating module, wherein the hydraulic system includes a hydraulic element, an upper lifting oil cylinder, and a lower lifting oil cylinder; the hydraulic element is connected to a motor; the hydraulic system is configured to jack up the work platform and is configured to cause, when the work platform is lowered, the hydraulic oil to flow back to the hydraulic element for anticlockwise rotation and energy recycling; the motor is configured to convert power of anticlockwise rotation of the hydraulic element into electric energy; the current distribution module is configured to rectify the electric energy and distribute the electric energy to the power battery and the hydraulic oil for use; the charging module is configured to charge the power battery; the battery heating module is configured to heat the power battery; and the hydraulic oil heating module is configured to heat the hydraulic oil.

As a preference, the current distribution module is a driving controller; and a battery management system performs secondary current distribution on the charging module and the battery heating module.

Beneficial effects of the present disclosure are as follows: The gravitational potential energy of the work platform is effectively recycled, which does not affect the design of lifting of the entire hydraulic system.

The safety and the stability are guaranteed. Due to the design that the same system includes two cylinders, stable lifting can be achieved, and energy can be effectively recycled.

The recycled energy is converted into electric energy, which can be reasonably used. Furthermore, the power battery and the hydraulic oil can be used more safely and reliably, and the service lives of the power battery and the hydraulic oil are also well ensured; and it is more energy-saving.

DETAILED DESCRIPTION OF THE EMBODIMENTS

Figure 1:
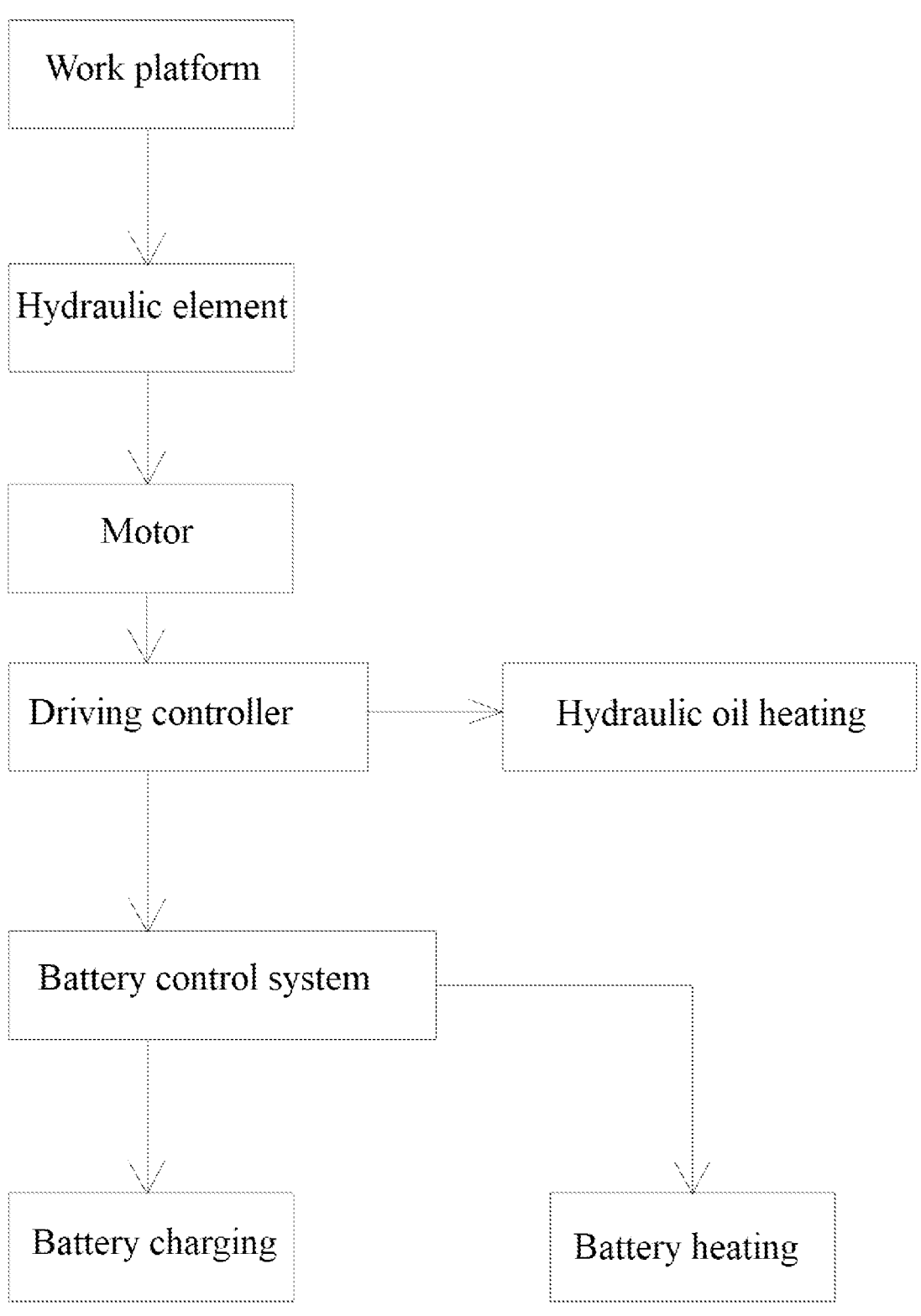
FIG. 1 is a flowchart of energy transferring in an energy control method of a lift truck in Embodiment 1.
Figure 2:
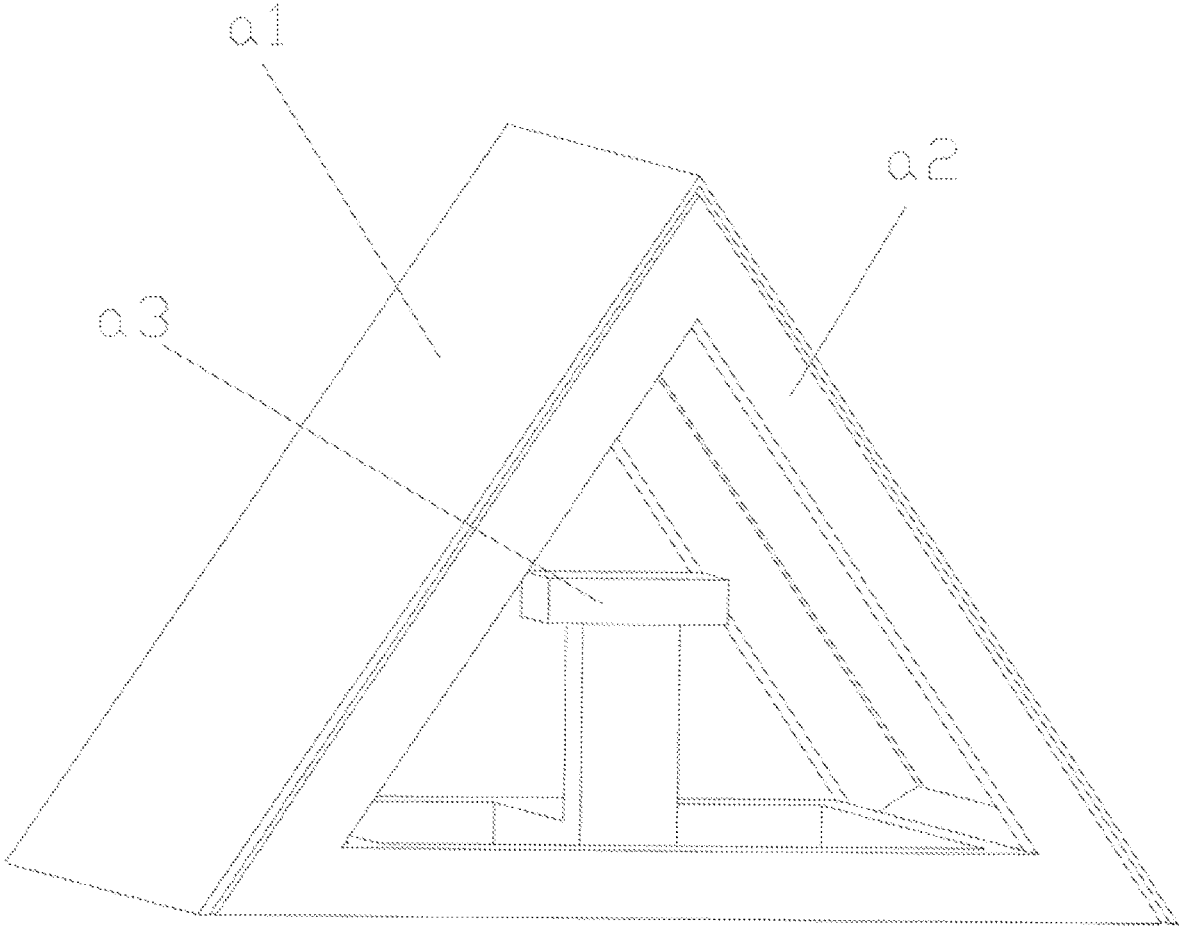
FIG. 2 is a schematic diagram of a three-dimensional structure in an implementation of a hydraulic oil heating film in Embodiment 1.
Figure 3:
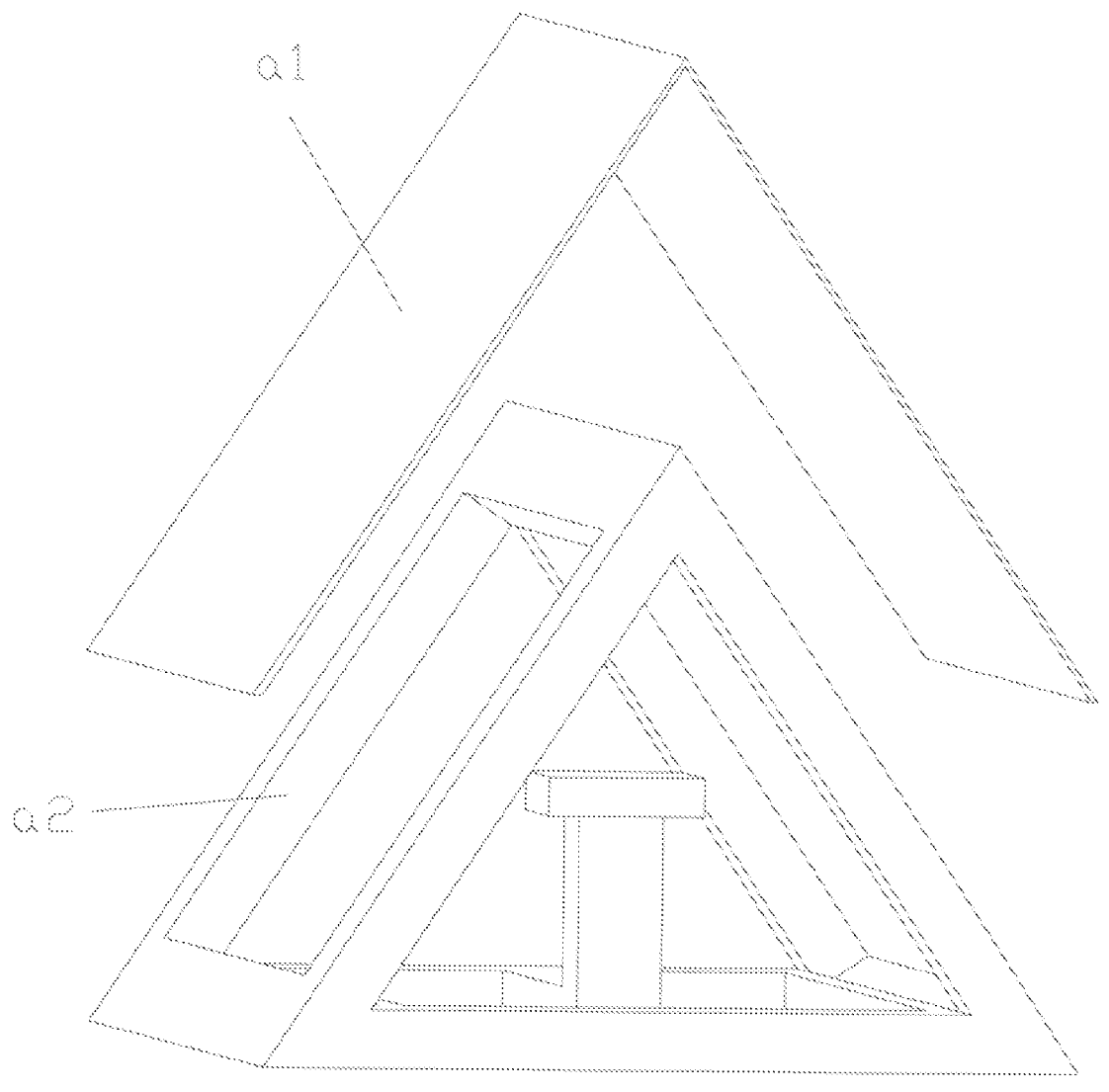
FIG. 3 is a schematic diagram of a three-dimensional structure in a split state of FIG. 2.
Figure 4:
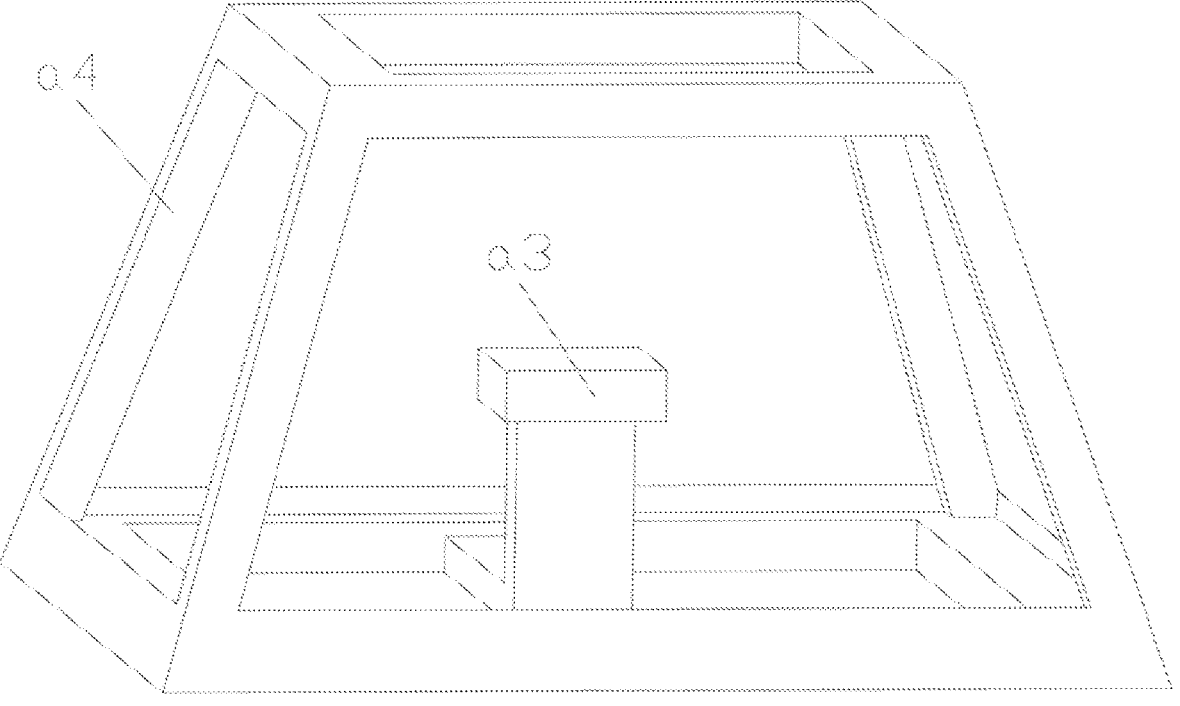
FIG. 4 is a schematic diagram of a three-dimensional structure of a supporting framework in another implementation of a hydraulic oil heating film in Embodiment 1.
Figure 5:
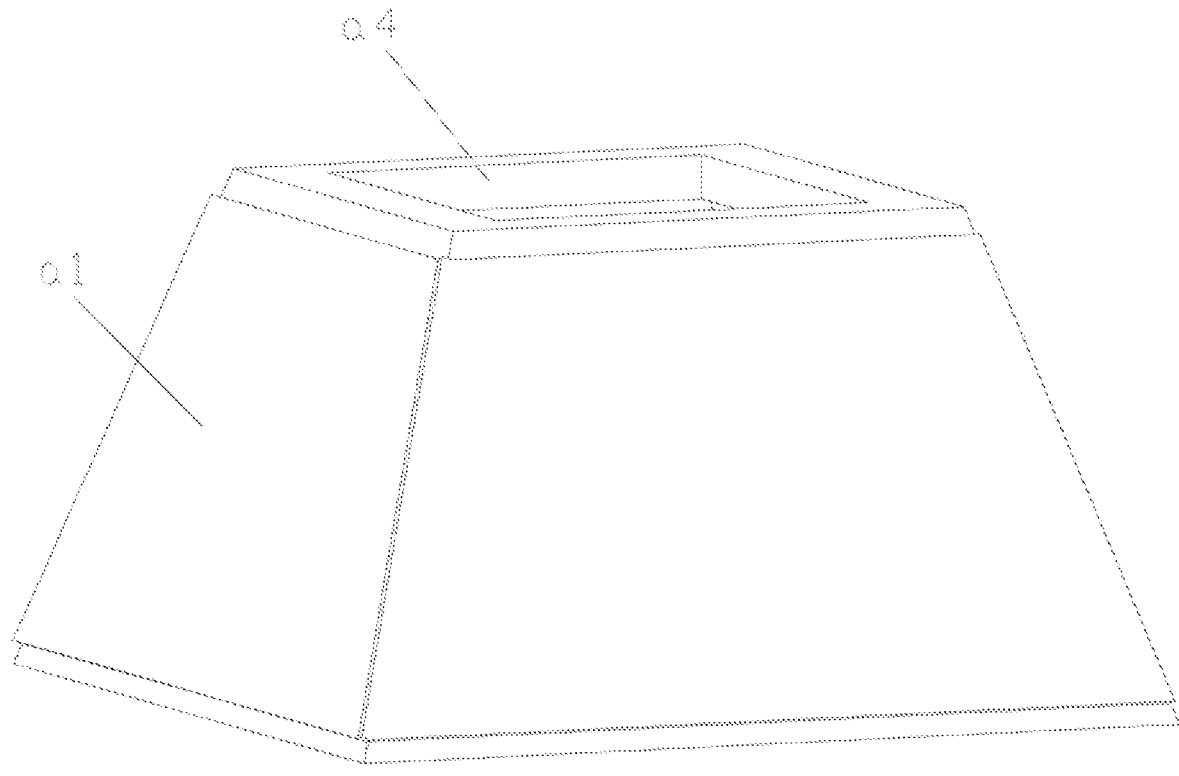
FIG. 5 is a schematic diagram of a three-dimensional structure of the structure in FIG. 4 with the hydraulic oil heating film.
Figure 6:
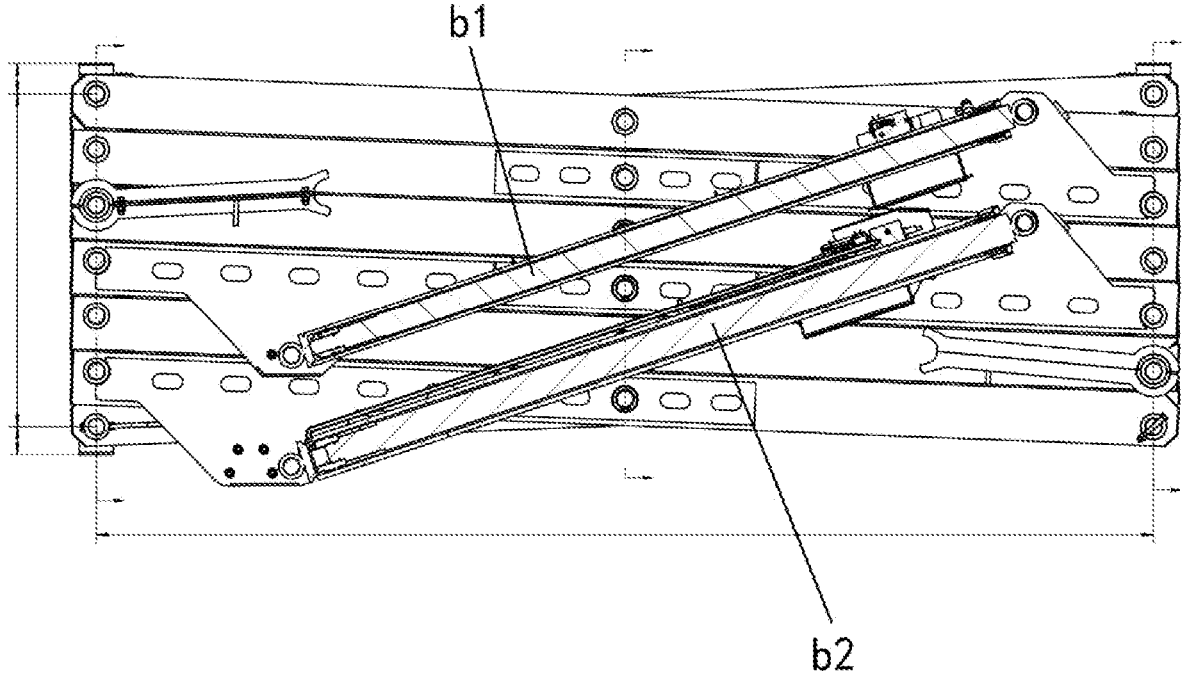
FIG. 6 is a schematic diagram of a lifting shear fork assembly used in a lift truck in Embodiment 1.
Figure 7:
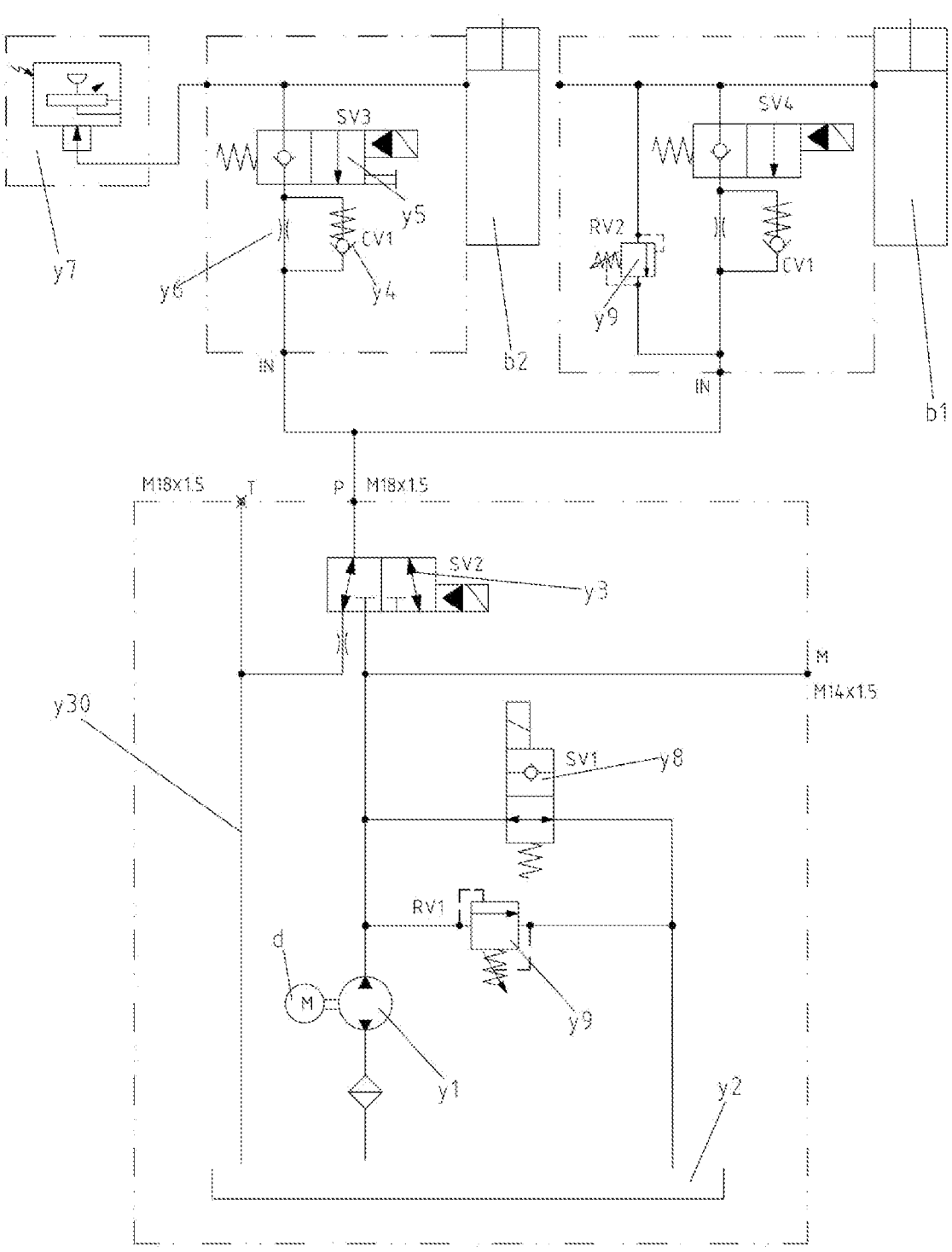
FIG. 7 is a schematic diagram of an optimized hydraulic system in Embodiment 1.

The present disclosure will be further explained below in detail in conjunction with the accompanying drawings.

This specific embodiment is only an explanation of the present disclosure and is not a limitation on the present disclosure. After reading this specification, those skilled in the art can make non-creative modifications to this embodiment as needed, but these modifications shall all be protected by the patent law as long as they fall within the scope of the claims of the present disclosure.

According to Embodiment 1, as shown in FIG. 1 to FIG. 7, an energy control method of a lift truck includes the following steps: step 1, the lift truck is put in a working state, and a work platform located at a high place is downwards closed, wherein hydraulic oil in an upper lifting oil cylinder and hydraulic oil in a lower lifting oil cylinder start to flow back into a oil tank. A lifting structure of the lift truck usually adopts an upper cylinder and a lower cylinder, and achieves rise and fall by respectively extending and retracting a boom and a small arm up and down. The work platform rises and falls through the lifting structure, so that a worker can do aerial work and get to the ground. When it is necessary to do the aerial work, oil enters a back side, namely, a driving side, of a piston rod of the upper lifting oil cylinder, so that the piston rod extends out; and oil also enters a back side of a piston rod of the lower lifting oil cylinder, so that the piston rod extends out. The entire lifting structure drives the work platform to rise to the high place and stop at a designated position. When the work ends, the work platform will be lowered, so that the work platform is downwards closed. After the work platform is lifted to the high place, the work platform is formed into a high gravitational potential energy, so that in the lowering process, the hydraulic oil on driving sides in the upper lifting oil cylinder and the lower lifting oil cylinder needs to flow back to the oil tank. This implementation recycles energy using the oil returning process. The following step will be executed. That is, step 2, a hydraulic element is driven to rotate anticlockwise in the back flowing process of the hydraulic oil, wherein the anticlockwise rotation of the hydraulic element drives a motor to rotate anticlockwise to generate a reverse electromotive force, and the reverse electromotive force is rectified to output direct current for energy recycling. In this process, the hydraulic oil flows back to drive the hydraulic element to rotate anticlockwise, which means that the potential energy is first converted into kinetic energy, this part of kinetic energy is provided for power generation through the anticlockwise rotation of the motor to generate electric energy, namely, to generate the rectified and output direct current which is referred to as a feedback direct current, and the feedback direct current is used. Step 3, a part of the recycled feedback direct current is applied to heating the hydraulic oil, and he other part is applied to heating and charging a power battery. In this embodiment, the recycled electric energy is applied to both the hydraulic oil and the power battery. If the hydraulic oil is in a low-temperature state, the performance of the hydraulic system will be as follows: The hydraulic oil will become sticky and also easily cause elements of the hydraulic system to be damaged. At this time, to cause the hydraulic oil to enter an appropriate work temperature range as soon as possible, the hydraulic oil needs to be heated. On the other hand, the power battery of course needs to be charged for electric energy supplementation. Furthermore, the performance of the power battery will be poor in a low-temperature state. Therefore, the power battery also needs to be heated by part of the electric energy. Under normal use, a speed at which the power battery enters the low-temperature state is higher than a speed at which the hydraulic oil enters the low-temperature state. Of course, the low-temperature states of the power battery and the hydraulic oil represent different temperatures, which will be explained later. Or, when a temperature of an external environment is extremely low, the power battery will enter a lower-temperature state, but high-current charging needs to be avoided. At this time, the hydraulic oil will also enter the low-temperature state. Since the power battery needs to be heated by part of the electrical energy, and the hydraulic oil also needs to be heated by part of the electrical energy, the electric energy for charging can be reduced, which can reasonably distribute the electric energy. Furthermore, an operating effect of a machine and a protection effect of the machine itself are both improved.

The above hydraulic element needs to adopt power equipment that works in the hydraulic oil, such as a hydraulic motor. The hydraulic element can further adopt a gear pump, but the hydraulic element is not limited to the hydraulic motor. Hydraulic power equipment can be used.

Further, in this embodiment, the temperature of the power battery in the low-temperature state needs to be less than $-8°$ C., and the temperature of the hydraulic oil in low-temperature state needs to be less than $45°$ C. Therefore, the following design is made:

Furthermore, in step 3, when the temperature of the power battery is greater than $-8°$ C., the feedback direct current is all received by the power battery and is configured to charge the power battery. The power battery here is in a non-low-temperature state, so the hydraulic oil is not in the low-temperature state. In this case, neither the power battery nor the hydraulic oil is heated, and the power battery is charged only.

When the temperature of the power battery is less than −8° C., and the temperature of the hydraulic oil is greater than 45° C., the feedback direct current is partially configured to heat the power battery and is partially configured to charge the power battery. In this state, the power battery is in the initial low-temperature state, but its temperature is not very low, and the temperature of the hydraulic oil is still high, so that the hydraulic oil does not need to be heated because of its normal working condition. The power battery needs to be heated because the power battery is in the low-temperature state. The other part of electric energy is used to charge the power battery. Under this condition, the temperature of the hydraulic oil is greater than 45° C. Although the battery has entered the low-temperature state, the temperature of the battery is not very low, so that the battery does not need to be heated. The converted electric energy can be completely used to charge the battery. However, this handling method is not as good as the previous method. A current for charging a low-temperature battery should not be too high. Therefore, one part of the electric energy is configured to heat the power battery, which means one part of the electric energy is shared, thus lowering the current for charging the power battery.

When an ambient temperature is extremely low, the temperature of the power battery and the temperature of the hydraulic oil will be further reduced. When the temperature of the power battery is less than −8° C. and the temperature of the hydraulic oil is less than 45° C., the feedback direct current is partially configured to heat the power battery, is partially configured to charge the power battery, and is partially configured to heat the hydraulic oil. In this case, the hydraulic oil has also entered the low-temperature state, and the power battery has entered a deep low-temperature state. At this time, both the power battery and the hydraulic oil should be heated. In this state, the charging current for the power battery needs to be further reduced, otherwise, the power battery will be significantly damaged. More electric energy is used to heat the power battery and the hydraulic oil, so that the electric energy for charging can be decreased to reduce the current. This achieves a reasonable distribution of the electrical energy, so that the elements will not be damaged, and the electric energy will not be wasted.

As a preference, the rectified and output direct current is rectified and output by a driving controller and is distributed to the power battery and the hydraulic oil for use on demand. The driving controller can use an existing current control driver which first rectifies the reverse electromotive force generated by the anticlockwise rotation of the hydraulic element and distribute power according to a requirement of the system. Part of the power is used for the power battery, and part of the power is used for the hydraulic oil. The current control driver is also a commonly used device in other industries when a direct current motor is changed from an engine to a generator, so as to form a controllable and stable current, which will not be repeated here. Of course, when the hydraulic oil returns to generate power, the motor needs to be powered off. This is a conventional operation to change the motor into the power generator.

In addition, the current distributed to the power battery is controlled by a battery management system to charge and heat the power battery separately. The current distributed to the power battery from the driving controller needs to be effectively managed, which requires configuration of a battery management system. The battery management system adopts the existing system, such as a BMS all-in-one machine. The current distributed by the driving controller to the power battery is distributed and used by the battery management system for overall management.

The concept of the above implementation is as follows: The feedback current generated by recycling the rotation kinetic energy converted from the potential energy of the closing of the work platform of the entire truck charges the power battery. The power battery is preferably a lithium battery. Therefore, to avoid high-current charging of the lithium battery at a low temperature, a hydraulic oil heating module is added, which can effectively reduce the current made into the lithium battery at the low temperature and can also cause the hydraulic oil to enter the appropriate work temperature range as soon as possible. Of course, a battery heating module can also share part of the current which is relatively low compared to the current for heating the hydraulic oil, but sharing this part of current can also achieve a certain protection effect on the battery. The battery management system and the driving controller will distribute and use the feedback direct current on demand. The battery management system is responsible for configuring charging and heating currents of the lithium battery, and the driving controller is responsible for configuring the heating current of the hydraulic oil and inputting a desired current for battery use to the battery management system.

As a preference, the heating of the hydraulic oil in step 3 is achieved by a hydraulic oil heating film. A hydraulic oil heating film can be made of an existing heating film material, but due to its application in the oil tank, the existing heating film is generally an integrated flat block. This embodiment further optimizes the structure of the hydraulic oil heating film. Specifically, the hydraulic oil heating film includes two oblique films a1 that are oblique relative to a horizontal plane. Tops of the two oblique films a1 are integrally connected to form the hydraulic oil heating film with an overall isosceles triangular shape, and the two oblique films a1 are in a mirror symmetrical shape. The hydraulic oil heating film forms a triangular cover structure and is placed in a middle lower part of the oil tank. Through the arrangement of the two oblique films, the hydraulic oil that is located at a middle upper part or is to be used is first heated, and then heating is slowly performed on the hydraulic oil below and around. There is a more reasonable distribution of a heating region. The two oblique films a1 are both of flat structures, and a flat triangular-prism-shaped support frame a2 is mounted below the two oblique films to support the two oblique films a1. The two oblique films a1 precisely lean against two sides of one triangular part of the triangular-prism-shaped support frame a2. The two oblique films a1 can be mounted and fixed on two adjacent borders of the triangular-prism-shaped support frame a2 using the existing fixation method, which improves the stability of the structure. The triangular-prism-shaped support frame a2 can be made of a high-temperature-resistant insulating hard material, and can be heavier and used as a counterweight to play a role of supporting and stabilizing a mold. A hydraulic oil temperature sensor a3 can also be further mounted on the triangular-prism-shaped support frame a2. The hydraulic oil temperature sensor a3 adopts a conventional oil temperature sensor and can be located directly below the two oblique films a1, preferably at a center of a region encircled by the triangular-prism-shaped support frame a2. The temperature at this position is representative of an oil temperature of the whole and can basically reflect an average temperature of the whole. Of course, the two oblique films a1 are two heated film bodies that need to be provided with some holes to avoid the influence, caused by an extremely high operating resistance of the hydraulic oil, on work. An arrow-shaped structure composed of the two oblique films a1 has higher strength and has better resistance to a pressure caused by the hydraulic oil flushing down. When output upwards, the hydraulic oil has a good guide effect. In a cold environment, the hydraulic oil has a better heating effect when flowing upwards. An angle between the oblique film a1 and the horizontal plane is controlled between 30 degrees and 60 degrees, preferably, 45 degrees. However, in the above implementation, the two oblique films a1 are formed by integral connection, so that the two oblique films actually belong to the same heating film and form the arrow-shaped structure by bending upwards at the center. The structure with the integrally connected tops will affect the flowing of the hydraulic oil, so it is necessary to form the holes in the two oblique films a1 to reduce the resistance to the oil. However, the holes always have an impact on the performance of the heating film, for example, affecting the heating efficiency and affecting the structural stability. A better implementation is provided below. Specifically, the hydraulic oil heating film includes three or more oblique films a1 that are oblique relative to a horizontal plane, and these oblique films a1 are connected integrally in sequence in a horizontal direction to form a pyramid-shaped hydraulic oil heating film with upper and lower openings. The structure with the upper and lower openings will reduce the impact on the flowing of the hydraulic oil, and a heating region is more three-dimensional and uniform. These oblique films a1 have good up-down supporting performance and circulation performance as sides, instead of the tops, of the oblique films are integrally connected. Of course, for better implementation, these oblique films a1 can be mounted and fixed on a pyramid-shaped support frame a4 and are nested and fixed on sides of the pyramid-shaped support frame a4, thus achieving a good usage effect. A center position inside the pyramid-shaped support frame a4 can also be provided and connected with a hydraulic oil temperature sensor a3 to better understand the temperature of the hydraulic oil and determine whether to heat the hydraulic oil according to the aforementioned condition. However, as mentioned above, the oblique films a1 can also be made and spliced separately. This achieves low heating efficiency.

In step 3, the heating of the power battery is achieved by a battery heating film. The power battery is heated using a conventional method. For example, a conventional battery heating film is arranged in a cell of a battery cell for heating.

More importantly, in step 1, the upper lifting oil cylinder b1 and the lower lifting oil cylinder b2 are located in the same hydraulic system. The hydraulic system lifts and lowers the upper lifting oil cylinder b1 and the lower lifting oil cylinder b2 together, and can also recycle energy during lowering. In order to better implement this solution, during design of the hydraulic system, the following improvements are made: The hydraulic system includes an emergency valve y3 which causes the hydraulic oil to flow back to the hydraulic element y1 to make the hydraulic element y1 rotate anticlockwise and recycle energy and then flow into the oil tank y2, and is switched to directly cause the hydraulic oil to flow back into the oil tank y2. In this way, when the hydraulic oil flows back, the hydraulic oil needs to flow back to the hydraulic element y1 for energy recycling in a normal state. The hydraulic oil flows from the other position of the emergency valve y3 to the oil tank in an emergency state. The emergency valve y3 can use a pilot-operated type two-position three-way electromagnetic valve.

In order to comply with the above design idea, an optimized hydraulic system is provided below to satisfy the use of the above method. The hydraulic system includes a hydraulic element y1, an upper lifting oil cylinder b1, and a lower lifting oil cylinder b2. The hydraulic element y1 is connected to a motor d through an existing transmission connection structure. For example, if the hydraulic element y1 uses a gear pump, a shaft of the gear pump is connected to a shaft of the motor d through a transmission structure such as a gear. Of course, the hydraulic system is provided with an oil tank y2. An oil input port of the hydraulic element y1 is communicated to the oil tank y2. An oil output port of the hydraulic element y1 is communicated to one inlet of the emergency valve y3. The hydraulic system further includes an emergency loop y30. One end of the emergency loop y30 is communicated to the oil tank y2, and the other end is communicated to the other inlet of the emergency valve y3. The emergency valve y3 only includes one outlet. The outlet of the emergency valve y3 is connected to two branches. One branch is connected to the upper lifting oil cylinder b1 and is referred to as a first branch, and the other branch is connected to the lower lifting oil cylinder b2 and is referred to as a second branch. Of course, the other branch is connected to a driving side of a piston rod in the oil cylinder. The first branch is connected in series with a check valve y4 and a two-position two-way directional valve y5, and two ends of the check valve y4 are connected in parallel with a throttle valve y6, so that oil is allowed to enter the upper lifting oil cylinder b1 during driving. The hydraulic oil enters the upper lifting oil cylinder b1 through the check valve y4 and the two-position two-way directional valve y5 on the first branch, so that the oil cylinder lifts the work platform. During lowering, the hydraulic oil flows back. The two-position two-way directional valve y5 switches the position to enable the hydraulic oil to flow back; the hydraulic oil flows through the throttle valve y6 to the emergency valve y3; and then the hydraulic oil flows through the emergency valve y3 to the hydraulic element y1 for anticlockwise rotation to recycle potential energy. The hydraulic oil then flows into the oil tank y2. However, if there is a fault, the hydraulic oil needs to directly flow into the oil tank. A working state of the emergency valve y3 needs to be switched, so that the hydraulic oil can flow from the emergency loop y30. In a normal state, the emergency valve y3 is in a state of keeping the branch with the hydraulic element y1 being connected to the outlet of the emergency valve y3. Similarly, the second branch is also connected in series with a check valve y4 and a two-position two-way directional valve y5, and two ends of the check valve y4 are connected in parallel with a throttle valve y6. However, the entire first branch can be connected in parallel with an overflow valve y9, which provides better protection during back flowing of the downward hydraulic oil. As more hydraulic oil will enter during the working of the first branch, a load may be larger. Therefore, the safety needs to be higher during lowering and back flowing. The two-position two-way directional valve y5 is preferably an electromagnetic valve, which is controllable. A duration of the valve after two-position switching is controlled through an automatic system. Of course, in order to ensure the safety of the system through pressure detection, a pressure sensor y7 for detection can be connected between the lower lifting oil cylinder b2 on the second branch and the two-position two-way directional valve y5 on the second branch, which also ensures that a pressure thereon can be fed back in a timely manner if it is abnormal. Further, the oil output port of the hydraulic element y1 and the oil tank are further directly connected in parallel with an unloading valve y8 and another second overflow valve y9. The two valves are also conventional configurations. The unloading valve y8 adopts a two-position two-way directional valve. The two valves are mainly for quickly discharging oil to reduce damages to the hydraulic element y1, system faults, and another problem in case of an accident caused by debugging, an extremely high pressure, or the like.

Through this design of the hydraulic system, it is possible to better provide power for oil discharging of the hydraulic element y1 and reversely recycle energy from returned oil.

Figure 8:
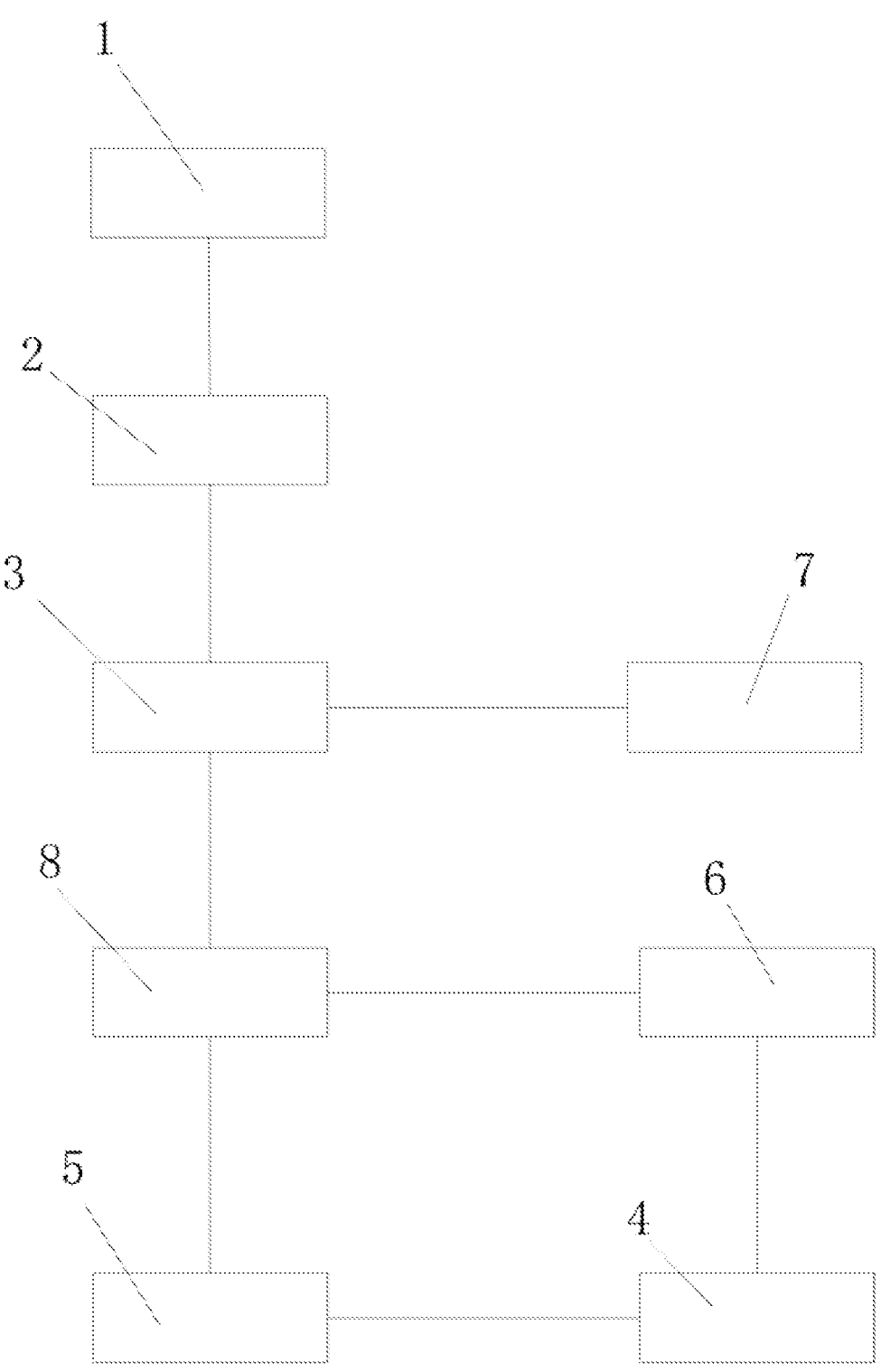
FIG. 8 is a module diagram of an energy control system in Embodiment 2.

According to Embodiment 2, as shown in FIG. 8, this embodiment provides a system applicable to implementing the energy control method of the lift truck in Embodiment 1. Specifically, it is an energy control system of a lift truck, including a work platform 1, a hydraulic system 2, a current distribution module 3, a power battery 4, a charging module 5, a battery heating module 6, and a hydraulic oil heating module 7.

The hydraulic system can use the hydraulic system in Embodiment 1, and includes a hydraulic element, an upper lifting oil cylinder, and a lower lifting oil cylinder; the hydraulic element is connected to a motor; the hydraulic system is configured to jack up the work platform and is configured to cause, when the work platform is lowered, the hydraulic oil to flow back to the hydraulic element for anticlockwise rotation and energy recycling; the motor is configured to convert power of anticlockwise rotation of the hydraulic element into electric energy; the current distribution module is configured to rectify the electric energy and distribute the electric energy to the power battery and the hydraulic oil for use; the charging module is configured to charge the power battery; the battery heating module is configured to heat the power battery; and the hydraulic oil heating module is configured to heat the hydraulic oil.

Further, the current distribution module is a driving controller; the system further includes a battery management system 8; and the battery management system performs secondary current distribution on the charging module and the battery heating module. The charging module can use a conventional charging circuit, and the battery heating module 6 and the hydraulic oil heating module 7 mainly use heating structures of heating films.

The foregoing descriptions are merely specific implementations of the present disclosure, but are not intended to limit the protection scope of the present disclosure. Any person skilled in the art can easily think of various equivalent modifications or replacements within the technical scope disclosed by the present disclosure. These modifications or replacements shall all fall within the protection scope of the present disclosure. Therefore, the protection scope of the present disclosure shall be subject to the protection scope of the claims.

What is claimed is:

1. An energy control method of a lift truck, wherein the method comprises the following steps: step 1, putting the lift truck in a working state, and downwards closing a work platform located at a high place, wherein hydraulic oil in an upper lifting oil cylinder and hydraulic oil in a lower lifting oil cylinder start to flow back into a oil tank; step 2, driving a hydraulic element to rotate anticlockwise in the back flowing process of the hydraulic oil, wherein the anticlockwise rotation of the hydraulic element drives a motor to rotate anticlockwise to generate a reverse electromotive force, and the reverse electromotive force is rectified to output direct current for energy recycling; and step 3, applying a part of the recycled feedback direct current to heating the hydraulic oil, and applying the other part to heating and charging a power battery.

2. The energy control method of the lift truck according to claim 1, wherein in step 3, when a temperature of the power battery is greater than −8° C., the feedback direct current is all received by the power battery and is configured to charge the power battery; when the temperature of the power battery is less than −8° C., and a temperature of the hydraulic oil is greater than 45° C., the feedback direct current is partially configured to heat the power battery and is partially configured to charge the power battery; and when the temperature of the power battery is less than −8° C. and the temperature of the hydraulic oil is less than 45° C., the feedback direct current is partially configured to heat the power battery, is partially configured to charge the power battery, and is partially configured to heat the hydraulic oil.

3. The energy control method of the lift truck according to claim 2, wherein in step 2, the rectified and output direct current is rectified and output by a driving controller and is distributed to the power battery and the hydraulic oil for use on demand.

4. The energy control method of the lift truck according to claim 3, wherein a current part distributed to the power battery is controlled through a battery management system to respectively charge and heat the power battery.

5. The energy control method of the lift truck according to claim 2, wherein the heating of the hydraulic oil in step 3 is achieved by a hydraulic oil heating film, and the heating of the power battery in step 3 is achieved by a battery heating film.

6. The energy control method of the lift truck according to claim 2, wherein the hydraulic oil heating film comprises two or more oblique films which are oblique relative to a horizontal plane and are integrally connected with each other.

7. The energy control method of the lift truck according to claim 1, wherein in step 1, the upper lifting oil cylinder and the lower lifting oil cylinder are located in a same hydraulic system.

8. The energy control method of the lift truck according to claim 7, wherein the hydraulic system comprises an emergency valve which causes the hydraulic oil to flow back to the hydraulic element to make the hydraulic element rotate anticlockwise and recycle energy and then flow into the oil tank, and is switched to directly cause the hydraulic oil to flow back into the oil tank.

9. An energy control system of a lift truck, wherein the energy control system comprises a work platform, a hydraulic system, a current distribution module, a power battery, a charging module, a battery heating module, and a hydraulic oil heating module, wherein the hydraulic system comprises a hydraulic element, an upper lifting oil cylinder, and a lower lifting oil cylinder; the hydraulic element is connected to a motor; the hydraulic system is configured to jack up the work platform and is configured to cause, when the work platform is lowered, the hydraulic oil to flow back to the hydraulic element for anticlockwise rotation and energy recycling; the motor is configured to convert power of anticlockwise rotation of the hydraulic element into electric energy; the current distribution module is configured to rectify the electric energy and distribute the electric energy to the power battery and the hydraulic oil for use; the charging module is configured to charge the power battery; the battery heating module is configured to heat the power battery; and the hydraulic oil heating module is configured to heat the hydraulic oil.

10. The energy control system of the lift truck according to claim 9, wherein the current distribution module is a driving controller; and a battery management system performs secondary current distribution on the charging module and the battery heating module.

* * * * *